United States Patent

Brena et al.

Patent Number: 5,530,045
Date of Patent: Jun. 25, 1996

[54] DISPERSIONS OF SALTS OF POLYMERS OR COPOLYMERS OF ACRYLIC ACID AND THE USE THEREOF AS THICKENING AGENTS

[75] Inventors: Marco Brena, Bergamo; Giuseppe Raspanti, Lombardo; Massimo Barzaghi, Monza, all of Italy

[73] Assignee: 3V Inc., Weehawken, N.J.

[21] Appl. No.: 235,942

[22] Filed: Apr. 29, 1994

[51] Int. Cl.⁶ .................................................... C08K 5/06
[52] U.S. Cl. .......................................... 524/376; 524/377
[58] Field of Search ..................................... 524/376, 377

[56] References Cited

U.S. PATENT DOCUMENTS 3,895,956  7/1975  Yoshida ................................. 524/189

FOREIGN PATENT DOCUMENTS 63-035899  2/1988  Japan .

Primary Examiner—Jeffrey T. Smith
Attorney, Agent, or Firm—Griffin, Butler, Whisenhunt & Kurtossy

[57] ABSTRACT

A dispersion consisting of: from 10 to 50% by weight of alkali metal, or amine or ammonium salts of crosslinked acrylic acid polymers or copolymers as dispersed phase and from 50 to 90% by weight of a dispersing phase, characterized in that the dispersing phase consists of a polyether of general formula (I):

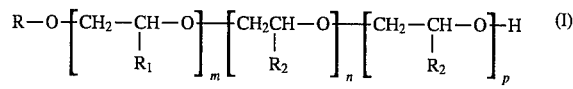

wherein R is hydrogen, a $C_1$–$C_{18}$ linear or branched alkyk group, aryl or aryl substituted with one or two $C_1$–$C_9$ alkyl groups, $R_1$, $R_2$ and $R_3$, which may be the same or different, are hydrogen or the methyl group, n, m, and p may take values ranging from 0 to 80 with the proviso that n+m+p is between 1 and 100.

8 Claims, No Drawings

DISPERSIONS OF SALTS OF POLYMERS OR COPOLYMERS OF ACRYLIC ACID AND THE USE THEREOF AS THICKENING AGENTS

The present invention relates to thickening agents, to the industrial use thereof and to processes for the preparation thereof.

In particular, the present invention relates to said thickening agents in the form of fluid dispersions of salts of crosslinked polyacrylates dispersed in polyethers.

BACKGROUND OF THE INVENTION

Polymers or copolymers of acrylic acid, crosslinked with polyfunctional vinyl monomers have been well-known since several decades. They are used as thickening, viscosizing, gelling, stabilizing agents of solutions, suspensions, emulsions. Their use is widespread in several industrials fields, such as for example inks, paper, textile printing, cleaning products, as well as in the food, cosmetic and pharmaceutical industry. There is a wide patent literature relating to the preparation and use of these polymers; for example in patent specifications U.S. Pat. No. 2,798,053, U.S. Pat. No. 2,980,655, U.S. Pat. No. 4,375,533, the preparation thereof is disclosed, while specific uses are disclosed for example in patent specifications EP 0 323 209, EP 0 268 164, DE 1 904 309, EP 0 210 130.

These polymers, which generally are in the form of very fine and light powders, are marketed in acid form. Their practical use indeed presents some difficulties. In fact, polymers in the acid form must be dispersed before in order to obtain a homogeneous and optimal dispersion; to this end suitable stirring systems are necessary, special addition methods of the powdery product to the dispersing fluid and long stirring times are required.

Further, the subsequent neutralization with bases can imply some practical difficulties, since the diffusion of the neutralizing agent into the polymer is not immediate, thus unwanted gels and lumps, which are difficult to dissolve, are likely to form.

Patent specification U.S. Pat. No. 5,256,737 discloses the preparation and the use of salts of polymers in the form of powder. These already salified polymers overcome the drawbacks raised by the preparation of the acid predispersions and their subsequent neutralization, but the drawbacks of the laborious method of addition to avoid the formation of lumps, the cumbersome handling of a very light powder, which is very difficult to handle with automatic dosage equipments still remain.

Patent specification IT 1,201,130 discloses dispersions of crosslinked polymers or copolymers of acrylic acid in $C_7$–$C_{22}$ fatty acids. By the use of these dispersions the handling of powders is avoided, but not the drawbacks from the use of polymers in the acid form, namely rather long stirring times necessary for the preparation of the aqueous dispersions, even because the dispersing phase is hydrophobic, and their subsequent neutralization.

Patent specification FR 2,677,655 discloses a process for the preparation of dispersions of crosslinked acrylic polymers or copolymers, in already salified form wherein the dispersing phase consists of $C_7$–$C_{22}$ saturated or unsaturated fatty acids. According to this process, a salt of the previously prepared polymer is added, or the salified polymer is "instantly prepared" by adding the acrylic polymer to a methanolic solution of an alkali metal. The methanolic suspension of the resulting salt is admixed with a fatty acid or with a mixture of fatty acids and subsequently the methanol is distilled off, which shall be purified before its recycle, if any.

Both preparation methods of these dispersions are rather laborious and costly.

Patent specification EP 0 383 057 discloses the preparation of salts of crosslinked acrylic polymers directly by emulsion polymerization of the monomers in the form of salts and subsequent removal of water by azeotropic distillation. In this case the dispersing phase consists of a mineral oil.

In the above disclosed processes, other than the difficult preparation, dispersions of salified polymers are obtained in hydrophobic solvents. In many cases these dispersions are not useful, particularly in the cosmetic and detergent field, when gels, lotions or other formulates, whose main characteristic is limpidity, are to be prepared.

As far as the textile printing field is concerned, more or less fluid dispersions of salified polymers, wherein the dispersing phase consists of a water-hydrocarbon mixture, are marketed. These formulates, of special use in printing pastes, have been marketed since a long time. They are prepared according to well-known processes from the powdery polymers or directly by emulsion polymerization as disclosed for example in patent specification DE 3,641,700.

But these formulates, due to their high mineral oil content, pollute the environment (air, earth, water), therefore, for ecological reasons, their use is more and more restrained and a next to the future ban can be expected.

Accordingly, there is an urgent technological need of new products, which are able to obviate all the above mentioned difficulties or drawbacks and which are ready to the use, of easy and simple use and which do not pollute the environment.

SUMMARY OF THE INVENTION

It has surprisingly been found that stable dispersions of the salts of crosslinked acrylic polymers or copolymers can be simply prepared by using particular matrixes of polyether kind as dispersing phase and that the so obtained dispersions are perfectly suitable to the present technological requirements.

DETAILED DESCRIPTION OF THE INVENTION

Object of the present invention are fluid dispersions containing from 10 to 50% by weight of the total of alkali metal, amine or ammonium salts of crosslinked acrylic acid polymers or copolymers as dispersed phase and from 50 to 90% by weight of a dispersing phase of general formula (I):

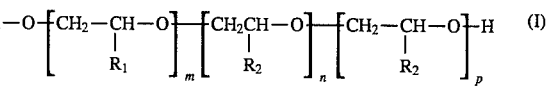

wherein R is hydrogen, a $C_1$–$C_{18}$ linear or branched alkyl group, aryl or aryl substituted with one or two $C_1$–$C_9$ alkyl groups, $R_1$, $R_2$ and $R_3$ may be the same or different and represent hydrogen or methyl group, n, m, and p may take values ranging from 0 and 80 with the proviso that the sum n+m+p is between 1 and 100.

Examples of $C_1$–$C_{18}$ alkyl group are methyl, ethyl, propyl, iso-propyl, pentyl, 3-methylbutyl, hexyl, heptyl, 4-methylheptyl, octyl, nonyl, decyl, dodecyl, tetradecyl, hexadecyl, octadecyl.

Examples of aryl and substituted aryl group are phenyl, toluyl, o-, m- and p-xilyl, 4-ter-butylphenyl, 2,4-di-ter-butylphenyl, 4-nonylphenyl.

Examples of salts of acrylic acid polymers or copolymers are the salts of sodium, potassium, ammonium, N,N-dimethylethanolamine, diethanolamine, triethanolamine.

According to the present invention, for the preparation of the dispersions, acrylic acid polymers, such those disclosed in Italian patent specification IT 1,200,825, patent specification BE 903354, polymers known with the Trade Name Carbopol®, manufactured by BF Goodrich, may be used, Preferred polyethers of formula (I) are those wherein R is hydrogen or a $C_1$–$C_{18}$ alkyl group, and the sum m+n+p ranges between 1 and 60.

Advantageously, these formulates are fluid, ready to the use and of easy handling. Their aqueous or hydroalcoholic solutions are limpid then can also be used for cosmetic and detergent formulations, wherein the main characteristic is the limpidity. The oxyethylenic-oxypropylenic condensation compounds (polyether) of formula (I), which are present in the dispersion as dispersing phase are well-known products and already widely used in all the above mentioned fields (see Nikolaus Schoenfeldt: Grenzflaechenaktive Aethylenoxid-Addeukte. Wissenschaftliche Verlagsgesellschaft GmbH Stuttgard 1976.—CTFA-Cosmetic Ingredient Handbook First Edition-Editor Joanne M. Nikitakis p. 71–91) . The use disclosed in the above references for these polyethers goes from surfactants, to solubilizing and emulsifying agents. These compounds are used in aqueous or non aqueous compositions as adjuvant agents for the formulation of polyphasic compositions and are used as such in rather low amounts.

As far as known to the applicant, dispersions of polyacrylate salts in polyoxyethylenic-polyoxypropylenic condensation compounds have never been disclosed.

A process for the preparation of the dispersions of the present invention is herein disclosed. This process is advantageously very simple with respect to the processes disclosed by the prior art.

In a first embodiment, the acrylic acid polymer is added to the dispersing phase, which already contains the neutralizing agent, then stirring is allowed till complete neutralization, for a time ranging from 0,5 to 1 hour. Very fine, homogeneous, more or less viscous dispersions are obtained.

In a second embodiment of the present invention, in the case that anhydrous ammonia is the neutralizing agent, the acrylic polymer can firstly be added to the dispersing phase, and subsequently the neutralizing agent can be added.

The viscosity of the dispersions depend on the nature of the oxyethylenic-oxypropylenic condensation product, the crosslinked polymer or copolymer used and its concentration. This last may range within wide, limits, generally between 10 and 50% by weight, preferably between 20 and 40%, such as to avoid to obtain dispersions with too low viscosity, which are not economical and generally poorly stable or with too high viscosity for practical use.

A further object of the present invention relates to a method for using the above described fluid dispersions.

With the dispersions according to the present invention aqueous or hydroalcoholic thickening compositions, which are particularly limpid, a highly appreciated characteristic in the formulation of cosmetic products, are obtained. On the other hand, the favourable characteristics of easiness of handling, metering, use and the low polluting properties make the dispersions of the present invention suitable for the use in the preparation of detergents, both for home and industrial use, printing pastes for the textile and ink industry.

The following examples further illustrate the present invention.

EXAMPLE 1

51 g of sodium hydroxide were dissolved into 330 g of a polyether of formula I (R=$C_{10}$–$C_{12}$ alkyl, $R_1$=$R_3$=H, $R_2$=$CH_3$, n=4, m=10, p=5) . 122.5 g of crosslinked acrylic polymer, prepared according to the example 1 of patent specification IT 1,200,825 were added to the solution.

Stirring was continued for one hour at a temperature of 20°–30 °C., obtaining a homogeneous, fluid suspension, with an active agent content of 30% and a viscosity at 20° C. of 1,100 cps (Brookfield, rotor 4, 20 rpm).

EXAMPLE 2

According to the method disclosed in the above Example 1, except substituting the acrylic polymer of example 1 with the crosslinked copolymer disclosed in Example 2 F of patent specification BE-903,354, a fluid suspension with a viscosity of 3,200 cps was obtained.

EXAMPLE 3

According to the method disclosed in the above Example 1, but using Carbopol 846® (manufactured by BF Goodrich) as crosslinked polymer a fluid suspension with viscosity of 7,600 cps was obtained.

EXAMPLES 4–16

According to the method disclosed in the above Example 1, using the same polymer, but different compounds of formula I and also varying the concentrations the dispersions listed in the following Table 1 were obtained.

TABLE 1

| Example | R | $R_1$ | $R_2$ | $R_3$ | m | n | p | viscosity cps | concentration % |
|---|---|---|---|---|---|---|---|---|---|
| 4 | H | H | $CH_3$ | — | 6 | 30 | 12 | 6100 | 25 |
| 5 | Alkyl $C_{10}$–$C_{12}$* | H | $CH_3$ | H | 4 | 10 | 5 | 600 | 25 |
| 6 | H | H | $CH_3$ | — | 30 | 5 | 0 | 4000 | 30 |
| 7 | H | H | $CH_3$ | — | 30 | 5 | 0 | 1600 | 20 |
| 8 | Alkyl $C_{12}$–$C_{18}$* | H | $CH_3$ | H | 3 | 7 | 3 | 1300 | 25 |
| 9 | $CH_3$ | $CH_3$ | — | — | 3 | 0 | 0 | 11000 | 30 |
| 10 | $CH_3$ | $CH_3$ | — | — | 3 | 0 | 0 | 850 | 10 |
| 11* | Alkyl $C_{10}$–$C_{12}$* | H | $CH_3$ | — | 4 | 2 | 0 | 3600 | 25 |

TABLE 1-continued

| Example | R | R$_1$ | R$_2$ | R$_3$ | m | n | p | viscosity cps | concentration % |
|---|---|---|---|---|---|---|---|---|---|
| 12 | C$_9$H$_{17}$—⟨phenyl⟩— | H | CH$_3$ | H | 5 | 10 | 5 | 25000 | 30 |
| 13 | C$_9$H$_{17}$—⟨phenyl⟩— | H | CH$_3$ | H | 5 | 20 | 7 | 4700 | 30 |
| 14 | C$_9$H$_{17}$—⟨phenyl⟩— | H | CH$_3$ | H | 5 | 20 | 7 | 1300 | 20 |
| 15 | CH$_3$ | CH$_3$ | — | — | 1 | 0 | 0 | 750 | 20 |
| 16 | H | CH$_3$ | — | — | 7 | 0 | 0 | 2700 | 25 |
| 17 | Alkyl C$_{12}$–C$_{14}$ | H | — | — | 7 | 0 | 0 | 1800 | 20 |
| 18 | C$_4$–H$_8$ | CH | H | — | 28 | 35 | 0 | 12000 | 25 |

*Residues deriving from mixtures of fatty alcohols normally available on the market and used for the preparation of this kind of polyethers.

EXAMPLE 19

100 g of crosslinked acrylic polymer of Example 1 were suspended into 377 g of polyether of formula I (R=H, R$_1$=CH$_3$, R$_2$=H, n=30, m=5, p=0) and stirring was allowed till to obtain a finely dispersed, homogeneous dispersion, then 23 g of gaseous ammonia were slowly added, while cooling so that the temperature did not rise above 30° C.

A dispersion containing 24.6% of the ammonium salt of the crosslinked polyacrylic acid with a viscosity of 3,500 cps was obtained.

EXAMPLE 20

Working as disclosed in the above Example 17, but using the polyether of formula I of example 8 as dispersing phase a dispersion with viscosity of 1,400 cps was obtained.

EXAMPLE 21

Preparation of a printing paste 15 g of the dispersion disclosed in Example 17 were added, under stirring, to 832 g of water containing 8 g of a melamine fixing agent, 120 g of acrylic binder, 25 g of Alizarin Blue BGT pigment and a vigorous stirring was performed till homogenization. A ready-to-the-use printing paste with a viscosity of 18,000 cps was obtained.

EXAMPLE 22

Preparation of a paste detergent for hard surfaces 4 g of the dispersion of the above Example 1 were added, at 40° C., to 250 g of an aqueous suspension containing 15 g of finely ground calcium carbonate and the mixture was strongly stirred for 10 minutes. A ready-to-the-use creamy, homogeneous, suspension, with a viscosity of 3,000 cps was obtained.

EXAMPLE 23

Skin hydrating emulsion

Phase A: 7 g of caprylic/caprinic triglyceride, 7 g of cetylstearyloctanoate, 5 g of octyldodecanol, 3 g of cetyl alcohol, 0.5 g of lanolin, 3 g of sorbitanethoxyl stearate (20), 0.05 g of propyl-p-hydroxy-benzoate were admixed.

Phase B: 5 g of propylene glycole, 0.3 g of imidazolidinyl urea and 0.05 methyl-p-hydroxybenzoate were dissolved in 67 g of water.

Phase A was added to phase B, previously warmed at 70° C., and stirring was maintained till complete homogenization, then 1.5 g of dispersion of the above Example 8 were added, stirring was continued while cooling till room temperature. A white, brilliant and stable emulsion was obtained.

EXAMPLE 24

Antidandruff shampoo 4 g of coccoylamido-propyl-betaine, 2.5 g of lauroyl diethanolamide, 2 g of cetylstearyl ethoxyilate alcohol (20 OE), 10 g of sodium lauryl ethere sulfate, 3 g of 10% dimethyldiallyl ammonium chloride-acrylamide copolymer aqueous solution, 2 g of zinc piridinethione and 1.5 g of the dispersion of the above Example 1 were added in the order to 75 g of water. The mixture was stirred for 30 minutes, obtaining a homogeneous, stable suspension.

EXAMPLE 25

Hair gel

A solution of 1 g of polyvinylpyrrolidone in 77.35 g of water was prepared. 20 g of propylene glycole, 0.2 g of polysorbate 20, 0.4 g of imidazolidiny lurea, 0.05 g of methylparaben and 1 g of the dispersion of the above Example 4 were added the so obtained solution. Stirring was continued till complete solution. A clear, brilliant gel was obtained.

On the contrary, by using the dispersions disclosed in patent specifications EP 0 383 057 and FR 2677655 opaque gels were obtained.

EXAMPLE 26

Dishwasher detergent gel 15 g of a 48–50 Bé sodium silicate solution, 10 g of sodium hypochlorite with 10% of active chlorine and 4 g of the dispersion of the above Example 10 were added to 71 g of water under stirring. A clear gel, with viscosity of 2,000 cps, was obtained.

We claim:

1. A fluid dispersion consisting essentially of: a dispersed phase of from 10 to 50% by weight of alkali metal, or amine or ammonium salts of crosslinked acrylic acid polymers or copolymers and a dispersing phase of from 50 to 90% by weight of a polyether of general formula (I):

$$R-O-\left[CH_2-\underset{R_1}{CH}-O\right]_m\left[CH_2\underset{R_2}{CH}-O\right]_n\left[CH_2-\underset{R_3}{CH}-O\right]_p-H \quad (I)$$

wherein R is hydrogen, a $C_1$–$C_{18}$ linear or branched alkyl group, aryl or aryl substituted with one or two $C_1$–$C_9$ alkyl groups, $R_1$, $R_2$ and $R_3$, which can be the same or different, are hydrogen or a methyl group, n, m, and p have values ranging from 0 to 80 with the proviso that n+m+p is between 1 and 100.

2. A dispersion according to claim 1, containing from 20 to 40% by weight of said salts.

3. A dispersion according to claim 1, wherein R is hydrogen or a $C_1$–$C_8$ alkyl group and the sum of m+n+p ranges between 1 and 60.

4. A dispersion according to claim 1, wherein the polyether is selected from the group consisting of the compounds having substituents

| | R | $R_1$ | $R_2$ | $R_3$ | m | n | p |
|---|---|---|---|---|---|---|---|
| 1 | $C_{10}$–$H_{22}$ | H | $CH_3$ | H | 10 | 4 | 5 |
| 2 | H | H | $CH_3$ | — | 6 | 30 | 12 |
| 3 | Alkyl $C_{10}$–$C_{12}$ | H | $CH_3$ | H | 4 | 10 | 5 |
| 4 | H | H | $CH_3$ | — | 30 | 5 | 0 |
| 5 | H | H | $CH_3$ | — | 30 | 5 | 0 |
| 6 | $C_{12}$–$C_{18}$ | H | $CH_3$ | H | 3 | 7 | 3 |
| 7 | $CH_3$ | $CH_3$ | — | — | 3 | 0 | 0 |
| 8 | $CH_3$ | $CH_3$ | — | — | 3 | 0 | 0 |
| 9 | Alkyl $C_{10}$–$C_{12}$ | H | $CH_3$ | — | 4 | 2 | 0 |
| 10 | $C_9H_{17}$–⟨phenyl⟩– | H | $CH_3$ | H | 5 | 10 | 5 |
| 11 | $C_9H_{17}$–⟨phenyl⟩– | H | $CH_3$ | H | 5 | 20 | 7 |
| 12 | $C_9H_{17}$–⟨phenyl⟩– | H | $CH_3$ | H | 5 | 20 | 7 |
| 13 | $CH_3$ | $CH_3$ | — | — | 1 | 0 | 0 |
| 14 | H | $CH_3$ | — | — | 7 | 0 | 0 |
| 15 | H | $CH_3$ | H | — | 5 | 30 | 0 |
| 16 | Alkyl $C_{12}$–$C_{14}$ | H | — | — | 7 | 0 | 0 |
| 17 | $C_4$–$H_9$ | $CH_3$ | H | — | 28 | 35 | 0 |

5. A method for thickening printing pastes comprising adding to the paste the dispersion of claim 1 as a thickening agent.

6. A method for thickening a composition selected from the group consisting of cosmetic creams, lotions, gels, shampoos and toothpastes comprising adding to the composition the dispersion of claim 1 as a thickening agent.

7. A method for thickening inks comprising adding to the inks the dispersion of claim 1 as a thickening agent.

8. A method for thickening liquid detergents comprising adding to the detergents the dispersion of claim 1 as a thickening agent.

* * * * *